United States Patent
Müller

[11] 3,904,028
[45] Sept. 9, 1975

[54] SLATTED CONVEYOR

[76] Inventor: Hugo Stefan Müller, Elbinger Str. 6, 996 Nordlingen, Germany

[22] Filed: July 2, 1973

[21] Appl. No.: 375,847

[30] Foreign Application Priority Data
July 6, 1972 Germany .......................... 2233063

[52] U.S. Cl. .............................................. 198/195
[51] Int. Cl.² ................................... B65G 15/42
[58] Field of Search .................. 198/195–197, 198/199

[56] References Cited
UNITED STATES PATENTS
| | | | |
|---|---|---|---|
| 3,262,549 | 7/1966 | Stewart et al. | 198/195 |
| 3,321,066 | 5/1967 | Christianson | 198/199 |
| 3,349,893 | 10/1967 | Jordan et al. | 198/195 |
| 3,509,987 | 5/1970 | Flaith et al. | 198/195 |

*Primary Examiner*—Evon C. Blunk
*Assistant Examiner*—Jeffrey V. Nase
*Attorney, Agent, or Firm*—Gerald S. Geren

[57] ABSTRACT

A slatted conveyor is provided, with longitudinally extending laterally-spaced slats supported on an endless belt, in which the gaps between the slats are closed by means of flexible bridging strips loosely engaged in slots in the sides of the slats. Each slat has a multi chamber hollow cross-section and the longitudinal margins of the bridging strips enter side chambers within the slats through the aforesaid slots, said margins having edge terminations so formed as to prevent the strip margins from slipping out of the slots.

7 Claims, 6 Drawing Figures

SLATTED CONVEYOR

The invention relates to a slatted conveyor advantageously having slats made of synthetic plastics material for accommodating the products to be conveyed, said slats comprising a multi-chamber hollow section member and being fixed on one or more supports, advantageously endless belts.

Slatted conveyors are used on a large scale in the textile industry for transporting textile fibres but can in addition also be used in practice in all spheres of the conveying art. The products to be conveyed are transported while lying directly on the slats. As a result, a certain loss of the conveyed products is produced by some of said products, depending on their nature, dropping through the unavoidable interstices between the separate slats of the slatted conveyor. By way of example, these losses occur with the already mentioned transporting of textile fibres, but also with the transport of products in bulk or of products which are wet and which lose some of the liquid during the transporting operation. Such losses are always undesired and troublesome, because they cause a soiling of the slatted conveyor and its surroundings, and more particularly also its driving mechanism, and consequently can lead to disruptions in the functioning thereof.

It is consequently the object of the invention to provide a slatted conveyor of the type initially referred to, in which the losses of the products being conveyed are restricted during the transporting operation to a minimum.

This object is achieved according to the invention by providing for the conveyed products impervious cover elements which cover the interstice between adjacent slats, by connecting these slats flexibly to one another laterally throughout their length.

With the novel slatted conveyor, it is no longer possible for the products or goods being conveyed to fall or drop between the separate slats. However, the mobility of the slatted conveyor, which is necessary on deflection around rollers or cylinders, is not in any way restricted thereby, since the cover elements flexibly connect the separate slats to one another. This connection is made in the effective region of the slatted conveyor, that is to say, over the entire length of the slats with the exception of at most a narrow marginal region, which often runs in a guide rail or is covered from below by the slat support. Because of their arrangement between the slats, the cover elements are in addition only subject to a small load, while the main load and the main wear are absorbed by the slats themselves.

A slatted conveyor according to the invention is advantageously so constructed that the slats comprise, at least on one side, a slot which extends throughout its length and in which engages a cover element connected to an adjoining slat. By this means, it is made possible for the connection of two slats of the slatted conveyor to be effected in a simple manner by one cover element, in that in fact the cover element connected to the one slat is fitted into the slot of the other slat or is inserted in the direction of the slot. A fixing of the cover element which goes beyond the loose guiding thereof in the slot or in the cavity of the slat disposed behind it is unnecessary, since the said cover element is only used for covering the interstice between two slats, but not for the mounting of said slats. The mounting of the slats is effected exclusively by fixing them on the slat supports. The arrangement of the cover elements in accordance with the invention, however, not only allows a simple mounting of the slatted conveyor, but also a convenient and rapid replacement of individual damaged slats, if these slats are in known manner removably arranged on the slat support, for example, with press buttons.

With one particularly advantageous constructional form of the novel slatted conveyor, the slats are slotted in identical manner on both sides and double T-shaped section bars or strips advantageously consisting of synthetic plastics material serve as cover elements. This constructional form permits a symmetrical design of the separate slats. The slats and the cover elements can be manufactured separately from one another, so that both can consist of different materials which are adapted in best possible manner to the purpose of use. With the assembly of the slatted conveyor, the cover elements are pushed longitudinally of the slats into the slots therein, the double T-shaped formation of said cover elements preventing them from slipping laterally out of the slots. The breadth of the web of the cover elements is preferably considerably larger than the respective spacing between two adjacent slats, so that the transverse bars project far into the cavities of the slats and hence the mobility of the slatted conveyor on being deflected around rollers is not impaired.

In a modification of this development of the novel slatted conveyor, the slats are likewise slotted on both sides and corrugated, flexible profiled strips consisting of synthetic plastics material or woven webs serve as cover elements. In this case, the cover elements are themselves yieldable, so that they can be expanded or compressed. In this case, the necessity is avoided of the cover elements, as in the constructional form previously referred to, being allowed to project far into the cavities of the slats when the mobility of the slatted conveyor is to be maintained. Corrugated and flexible profiled strips can be produced in a particularly simple manner from synthetic plastics material. For securing them against slipping out of the slots in the slats, these cover elements, in a manner similar to the double T-shaped profiled strips, can have a transverse bar on their edge, but the same purpose is also fulfilled by a thickening or a groove.

With both constructional forms of the slatted conveyor, it is proved to be desirable to secure the cover elements at their two ends against working out of the slats transversely of the conveying direction, by one of the two associated slats being closed at the corresponding end of the slot. This can be effected by small retainer blocks being stuck in the respective slot or also by the respective slot only extending to just before the end of the slat, so that an unslotted marginal zone still remains and closes the slot. This procedure nevertheless permits an easy assembly and dismantling of the slatted conveyor, especially when the two slots of one slat are each closed at the same end of the slat, and in fact, from slat to slat, alternately at one and the other sides of the slatted conveyor. The slats can then be separately replaced without also removing the cover elements.

In another expedient constructional form of the slatted conveyor according to the invention, the slats are slotted on one side and have on the opposite side, at the height of the slot, a T-shaped, flexible extension which serves as cover element. In this case, the assembly of the slatted conveyor is just as simple as with the constructional examples already referred to. The flexible constructional form of the extension, which favours the mobility of the slatted conveyor, can be achieved without any difficulty by the slat proper being made of hard PVC and its extension of soft PVC. This arrangement can readily be obtained in one working step with suitable extruders.

In another advantageous constructional form, the slats of the slatted conveyor according to the invention are slotted on both sides and the section members opened up thereby mutually interengage. As a result, the slats of the slatted conveyor are brought very close togehter, so that they form a very stable support for the goods being conveyed. This constructional form is consequently particularly suitable when conveying heavy goods.

Constructional examples of the invention are shown in the drawings and are hereinafter more fully described. In the drawings.

Figure 1:
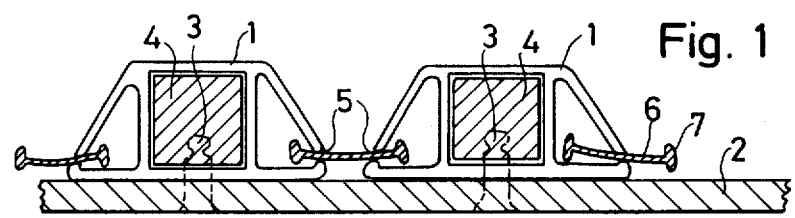
FIG. 1 is a section transversely of the slats through a part of a slatted conveyor, using double T-shaped cover elements.

FIG. 1 shows slats 1 of a slatted conveyor, which are fixed on a slat support or carrier 2 and have a three-chamber hollow section. The fixing of the slats 1 on the slat support is effected by means of press studs 3, of which one component is connected fast to the slat carrier 2 while the counteracting part is fitted into a filler body 4 which is disposed above the slat support 2 in the central chamber of the three-chamber hollow section. The fixing of the slats of the slatted conveyor on the slat support 2 by means of press studs permits a convenient and rapid assembly of the slatted conveyor and also replacement of damaged or worn slats.

The slats 1 are made symmetrical, so that they can be fixed in both possible directions on the slat support 2. The two outer chambers of the three-chamber hollow section are provided over the entire length of the slat 1 with a lateral slot 5. Double T-shaped cover elements 6 engage through these slots into each of the lateral chambers of the slats 1 and as a result provide a connection between each two adjoining slats which is impervious to the products or goods being conveyed. The transverse bars 7 on the cover elements 6 prevent the cover elements sliding out of the slats 1 in the conveying direction. The cover elements 6 are decidedly broader than the respective interstice between two adjacent slats, so that they project a considerable distance into the lateral chambers of the slats and are only loosely guided therein. As a result, the flexibility which the slatted conveyor requires as it is deflected around guiding or driving rollers is assured.

The assembly of the cover elements 6 is effected in a simple manner by pushing the elements into the slots 5 longitudinally of the slats 1. The slats 1 and the cover elements 6 are preferably each made of synthetic plastics material, for example, of polyvinyl chloride (PVC). However, it is also possible to use other materials and other types of sections for the slats. Thus, a slatted conveyor according to the invention can also be produced with slats made of metal or of multi-chamber synthetic plastic sections with a wooden core.

Figure 2:
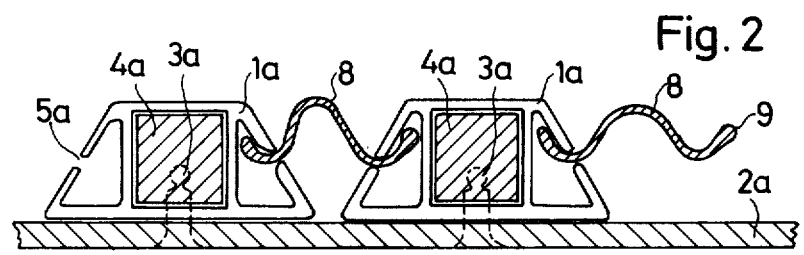
FIG. 2 is a section similar to FIG. 1 through a slatted conveyor having corrugated, flexible cover elements.

FIG. 2 shows a section through a slatted conveyor similar to FIG. 1. Similar parts therefore bear the same reference numerals as in FIG. 1, but provided with the index a. The essential difference from the constructional example according to FIG. 1 is that the cover element in this case is a corrugated, flexible profiled strip 8 of synthetic plastics material. Soft PVC is for example considered as material for the cover element. Since the corrugated profiled strip 8 is flexible and consequently can be expanded or compressed, it is not necessary for it to project with its thickened rims 9 far into the lateral chambers of the slats 1a in order to guarantee the flexibility of the slatted conveyor. These chambers accordingly only have to have a very small cross-section. The corrugated profiled strips 8 have thickened edges 9, so as to prevent them slipping out of the slots 5a. Instead of this arrangement, the edge of the profiled strips 8 could terminate in a transverse bar, similar to the constructional example of FIG. 1.

In this example, as also in the previous example, it is desirable if the profiled strips 6 and 8, respectively, are secured against gradually sliding out of the slots transversely of the conveying direction.

This is obtained in a simple manner by two small retaining blocks, such as 14a and 14b or 15a and 15b, being stuck on the ends of the slats 1 or 1a in their lateral chambers for each profiled strip, or by the respective slots 5 or 5a being enclosed by said slots only extending up to shortly before the end of the slat, whereby a unsolotted marginal region, such as 16aand 16b or 17a and 17b, is left which prevent profiled strips 6 or 8 working their way out of the slats 1 or 1a while the slatted conveyor is in operation.

It is advantageous for two such closure arrangements to be arranged in the slots at the same end of a slat, and in fact alternately from slat to slat on one and then on the other side of the slatted conveyor. The slats can then be separately replaced or fitted without having to displace any profiled strips 6 or 8. However, it is also possible for the two closure means belonging to a profiled strip to be arranged alternately or in the same slot of each slat. In this case, when a single slat is replaced, a profiled strip 6 and 8 is also always replaced.

Figure 3:
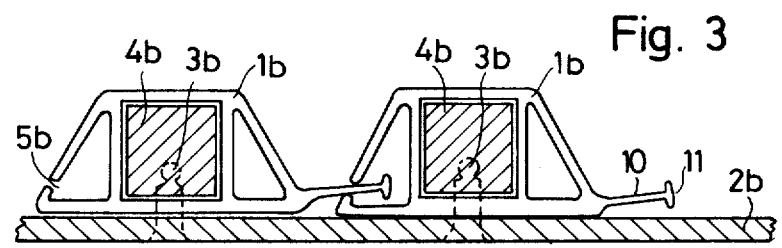
FIG. 3 is a section similar to FIG. 1 through a slatted conveyor of which the slats have on one side a T-shaped, flexible extension.

FIG. 3 shows a section similar to FIG. 1 through another slatted conveyor. Similar parts are provided with the same references as in FIG. 1, but with the index b. In this constructional example, the slats 1b are only slotted on one side and have on the side opposite the slot 5b a flexible, T-shaped extension 10, which serves as cover element and engages in the slot 5b of the adjacent slat 1b. Any slipping of the cover element out of the slot in the conveying direction is prevented, as in FIG. 1, by the transverse bar 11 on the T-shaped extension 10. The flexibility of the extension 10, by which the mobility of the slatted conveyor is assisted, can for example be produced by the slat proper 1*b* consisting of hard PVC and the extension 10 of soft PVC. Such slats can without any difficulty be manufactured in a single working step. Since in this constructional example the cover elements are an integral component of the slats, they do not have to be secured against sliding out transversely of the conveying direction.

Figure 4:
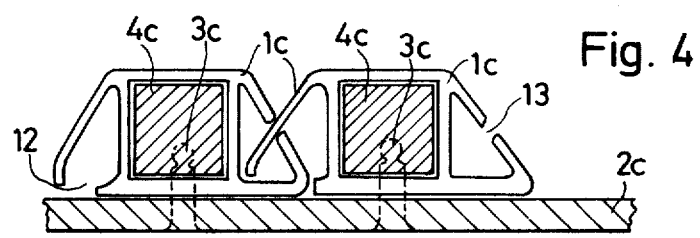
FIG. 4 is a section similar to FIG. 1 through a slatted conveyor, of which the slats are slotted on both sides and their sections are mutually interengaged.
Figure 5:
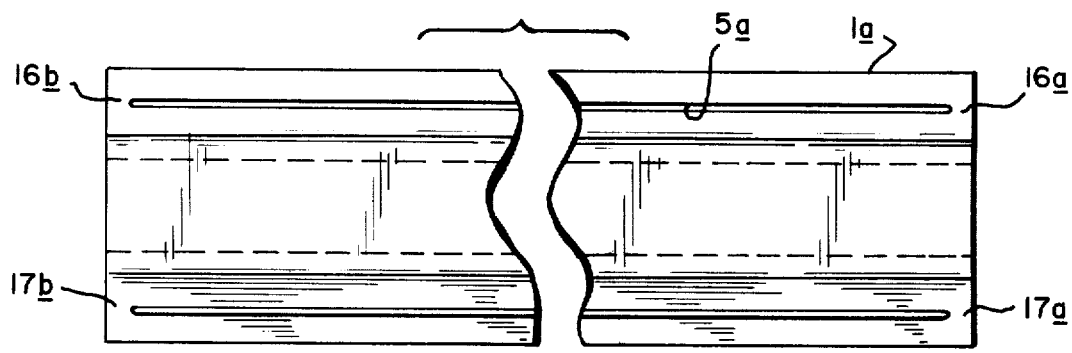
FIG. 5 is a plan view of an elongated slat, with a portion broken away for ease of illustration, showing elongated side slots having marginal edge retaining portions.
Figure 6:
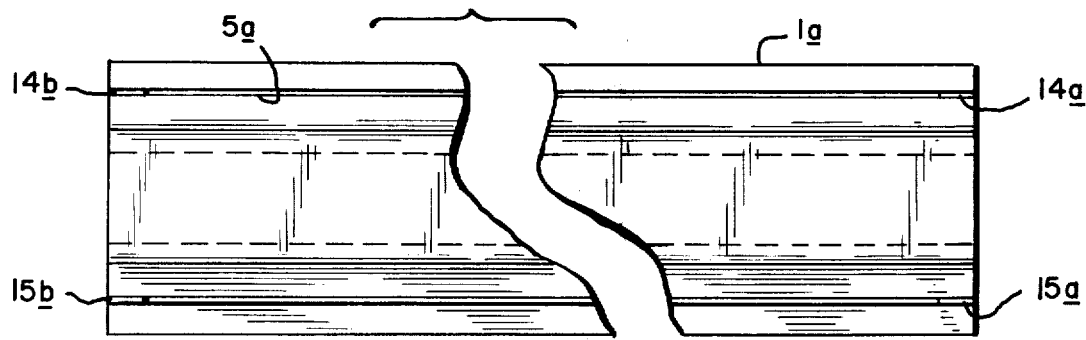
FIG. 6 is a plan view similar to FIG. 5 showing another slat with the side slots extending to the edge of the slat and those side slots being closed by end retaining blocks.

FIG. 4 shows a cross-section similar to FIG. 1 through a last constructional example of a slatted conveyor. Similar parts are provided with the same references, but with the index *c*. Once again serving as the basis are slats 1*c* which have a three-chamber hollow section. These slats are provided throughout their length with lateral slots 12 and 13. The slots 12 and 13 are in this case so arranged that the hollow sections opened up by the said slots are able alternately to engage one within the other. By this means, the separate slats 1*c* can be arranged very closely adjacent one another, so that a slatted conveyor as so constructed forms a particularly strong and stable support for the products being conveyed. Consequently, it is particularly suitable for conveying heavy goods. In this constructional example, each slat consequently serves both as a support for the goods being conveyed and as a cover element with its lateral parts.

I claim:

1. A conveyor which includes:
at least one support, such as an endless belt;
a plurality of elongated, plastic, slats mounted to said support in spaced relation to each other for accommodating the products being conveyed, each of said slats comprising a multi- chamber section which includes means defining a central section and means defining a pair of hollow side chambers, said side chambers being positioned adjacent but on opposite sides of said central section, and each of said side chambers including means defining an elongated, cover-element-receiving slot opening into said side chamber, said slot-defining means being spaced from said central section; and
a plurality of elongated, flexible, strip-shaped, plastic cover elements, which are impervious to the products being conveyed, for cooperation with adjacent slats to cover the spaces therebetween, and for loosely and flexibly connecting adjacent slats, each of said cover elements having a width greater than the normal spacing between two adjacent slats, and each cover element including:
web means which extend through the slots in adjacent slats, and
transverse bar means along each of the longitudinal margins of said web means, said bar means being positioned within each of said side chambers and being substantially smaller than said side chamber, said bar means and said web means defining a double-T shape for said cover element; and said cover element providing said loose and flexible connection between adjacent slats and accommodating changes in the lateral spacing between said slats, by said web means being movable through said slots and by each bar means being movable within a side chamber.

2. A slatted conveyor according to claim 1, wherein the cover elements are secured at their two ends against working out of the slats transversely of the conveying direction by one of the two associated slats being closed at the corresponding end of the slot.

3. A slatted conveyor according to claim 1 wherein a small retaining block is stuck in the respective slot for securing the cover elements.

4. A slatted conveyor having slats, such as of synthetic plastics material, for accommodating the products being conveyed, said slats each comprising a multi-chamber hollow section and being fixed on at least one support, such as an endless belt; further comprising cover elements which are impervious to the products being conveyed, which elements cover the interstice between adjacent slats by the said elements flexibly connecting the slats to one another laterally along their length; and each slat having on one side a slot extending throughout its length, into which engages a cover element connected to an adjoining slat, wherein the slats are slotted on both sides, and corrugated flexible profiled strips, such as of synthetic plastics material, serve as cover elements.

5. A slatted conveyor having slats, such as of synthetic plastics material, for accommodating the products being conveyed, said slats each comprising a multi-chamber hollow section and being fixed on at least one support, such as an endless belt; further comprising cover elements which are impervious to the products being conveyed, which elements cover the interstice between adjacent slats by the said elements flexibly connecting the slats to one another laterally along their length; and each slat having on one side a slot extending throughout its length, into which engages a cover element connected to an adjoining slat, and a T-shaped, flexible extension on the opposite side at the height of the slot, said extension serving as cover element.

6. A slatted conveyor having slats, such as of synthetic plastics material, for accommodating the products being conveyed, said slats each comprising a multi-chamber hollow section and being fixed on at least one support, such as an endless belt; further comprising cover elements which are impervious to the products being conveyed, which elements cover the interstice between adjacent slats by the said elements flexibly connecting the slats to one another laterally along their length; and each of said slats being slotted on both sides and the sections opened up thereby alternately engage one within the other so as to provide said cover element.

7. A slatted conveyor having slats, such as of synthetic plastics material, for accommodating the products being conveyed, said slats each comprising a multi-chamber hollow section and being fixed on at least one support, such as an endless belt; further comprising cover elements which are impervious to the products being conveyed, which elements cover the interstice between adjacent slats by the said elements flexibly connecting the slats to one another laterally along their length; and each slat having on one side a slot extending throughout its length, into which engages a cover element connected to an adjoining slat; said slats being slotted in the same way on both sides and profiled strips, such as of synthetic plastics material, and which are double-T shape, serve as cover elements; said cover elements being secured at their two ends against working out of the slats transversely of the conveying direction by one of the two associated slats being closed at the corresponding end of the slot; and for securing the cover elements, the respective slot only extends to shortly before the end of the slat, so that an unslotted marginal zone is still left on the respective side of the slat and closes the slot.

* * * * *